Nov. 14, 1967 R. M. BERLER 3,352,099
MULTIPLE ELAPSED TIME INTERVAL READOUT DEVICE
Filed Jan. 20, 1966 3 Sheets-Sheet 1
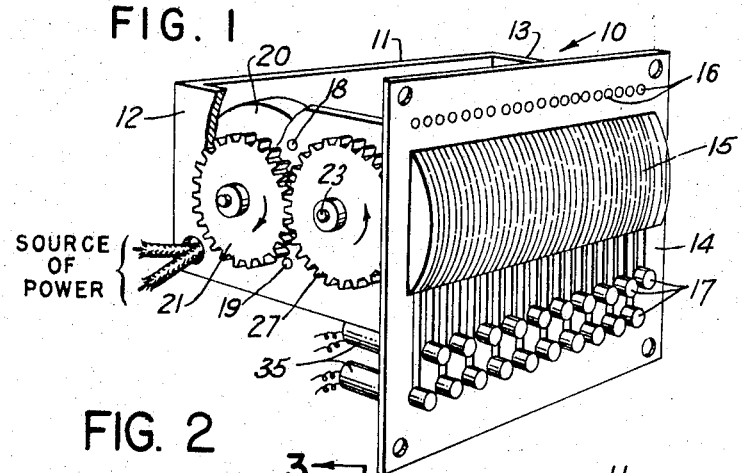
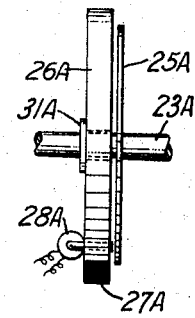
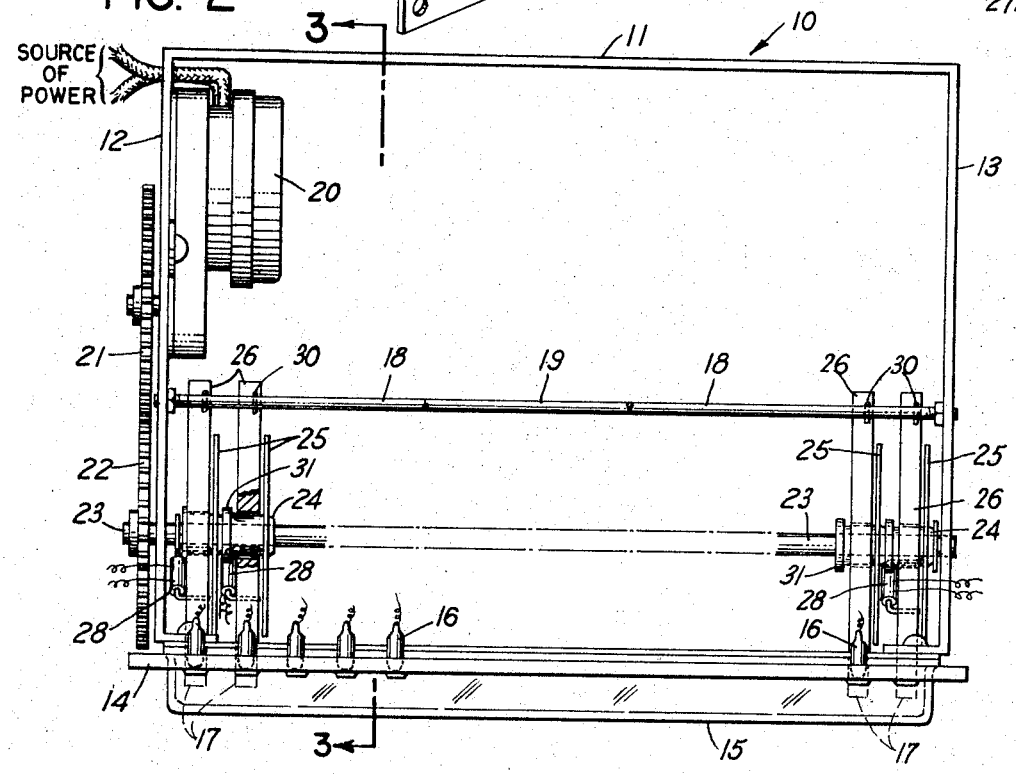
INVENTOR
ROBERT M. BERLER
BY Charles J. Worth
AGENT

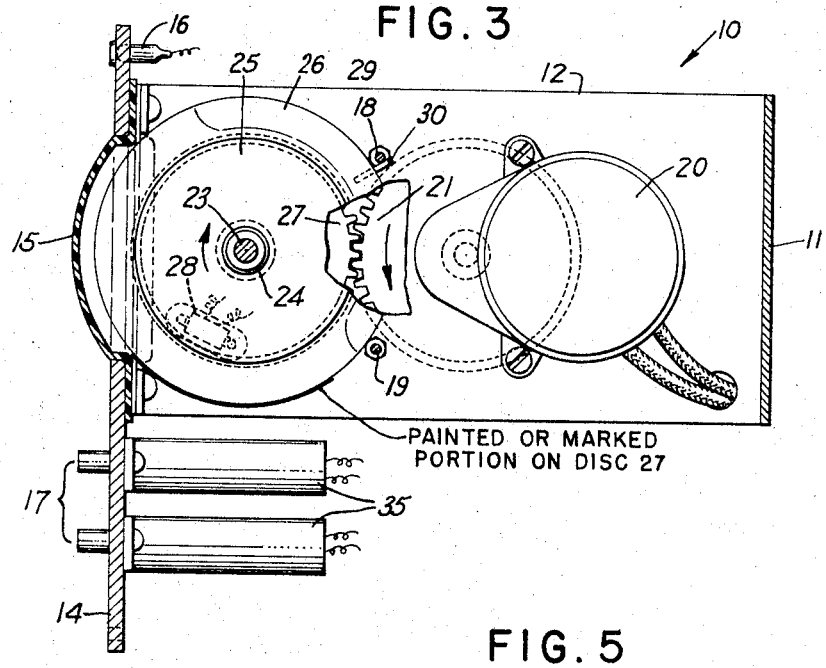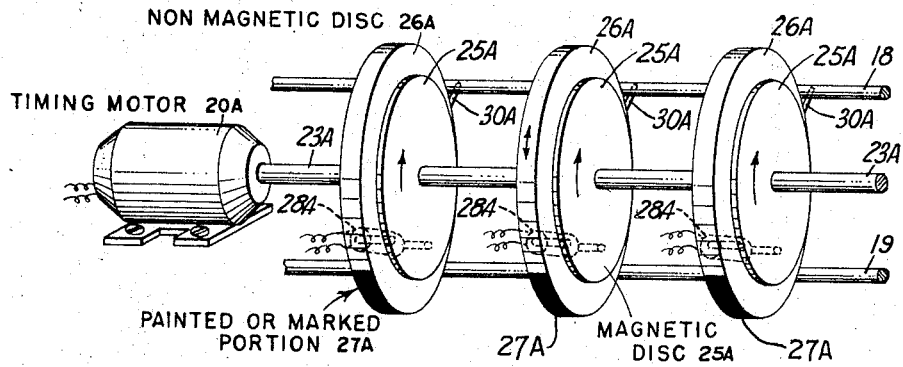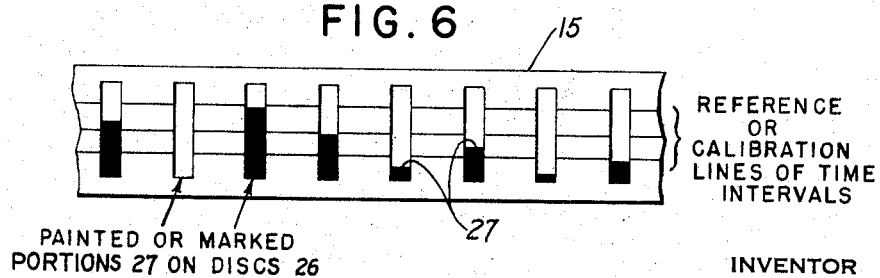

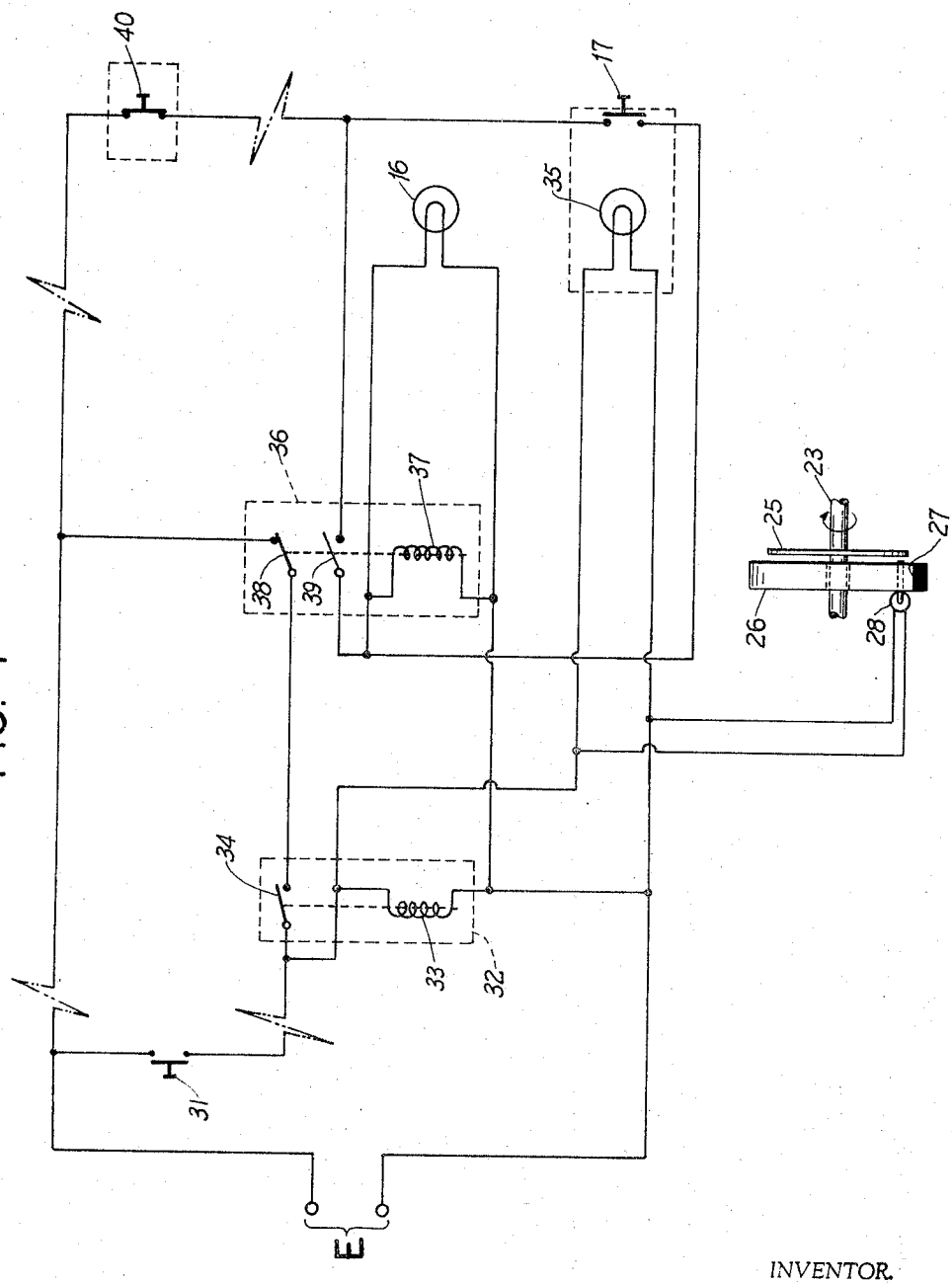

United States Patent Office 3,352,099
Patented Nov. 14, 1967

3,352,099
MULTIPLE ELAPSED TIME INTERVAL READOUT DEVICE
Robert M. Berler, Westport, Conn., assignor to American Machine & Foundry Company, a corporation of New Jersey
Filed Jan. 20, 1966, Ser. No. 521,782
10 Claims. (Cl. 58—39.5)

This invention relates to time measuring and indicating apparatus and particularly to devices for measuring and visually indicating an elapsed time interval or, simultaneously, a plurality of elapsed time intervals which can be compared one to the other.

Such devices are particularly adapted, although they are not limited for use in automatic drive-in type restaurants where it is desirable that the management be kept informed of the current waiting times incurred by its customers at different service locations prior to placing orders. This information is useful both to establish proper order taking priority among the waiting customers so as to avoid complaints, and to provide data to determine whether changes in operating procedures may be necessary to provide more efficient and faster customer service.

The device in accordance with the invention may also be used for measuring and visually indicating elapsed time intervals in connecting with factory timers, a process of manufacture, a number of pending calls in a telephone exchange waiting times, and for many other and varied purposes.

An object of the invention is to economically provide automatic measurement and visual indication of elapsed time intervals.

Another object is to provide economical means for measurement and visual indication of the relative elapsed time intervals between the commencement of a plurality of successive events.

The present invention contemplates an elapsed time interval measuring and indicating device comprising a casing having a panel with a presentation window; constant speed motor means disposed in the casing; a shaft rotatably mounted in the casing and connected to the motor means to be driven thereby at a constant speed; a plurality of disc indicator assemblies disposed in spaced series along the length of the shaft each for providing an elapsed time interval indication; each disc indicator assembly having an indicator disc freely rotatable on the shaft, a drive disc on one side of the indicator disc and fixedly connected to the shaft to be driven thereby, and electromagnetic means to magnetically couple, when energized, the indicator disc to the drive disc for driving the indicator disc thereby; each indicator disc having a normal idling position and a peripheral indicating portion hidden from view through the window when the indicator disc is in its idling position and progressively rising with time into view in the window when the indicator disc is driven; and circuit means for each disc indicator assembly having a first switch means for providing current to energize the electromagnet for coupling the indicator disc to the drive disc at commencement of an elapsed time interval to be measured and second switch means for de-energizing the electromagnet at the end of a measured elapsed time interval.

The foregoing and other objects and advantages will appear more fully hereinafter from a consideration of the detailed description which follows, taken together with the accompanyng drawings wherein several embodiments of the invention are illustrated by way of example. It is to be expressly understood, however, that the drawings are for illustration purposes only and are not to be construed as defining the limits of the invention, wherein:

FIGURE 1 is a perspective view of an elapsed time interval measuring and indicating device made in accordance with the present invention, FIGURE 2 is an enlarged plan view of the novel device of FIGURE 1, FIGURE 3 is a sectional view taken on line 3—3 of FIGURE 2, FIGURE 4 is a front elevational view of a modified disc indicator assembly, FIGURES 4A and 4B are side views of the indicator and driving discs, respectively of the modified assembly of FIGURE 4, FIGURE 5 is a perspective view of a modified indicator drive arrangement, and several modified assemblies of FIGURE 4, FIGURE 6 is a fragmentary elevational view illustrating a typical bar graph appearance of the device of FIGURE 1 when in operation, and FIGURE 7 is an electrical diagram of a control circuit for one disc indicator assembly.

Referring now to the drawings, and particularly FIGURES 1 to 3, an elapsed time measuring and indicating device 10 made in accordance with the present invention has a case 11, which may be open at the top and bottom as shown, with a pair of spaced side walls 12 and 13. A panel or face plate 14 is connected to the front ends of walls 12 and 13 in any well known manner, and may be provided with means for mounting the device 10 in a piece of equipment (not shown).

Plate 14 has a single large window or lens 15 preferably masked to expose only a plurality of indicator members 26 in the device 10 to view, and has provision for mounting a plurality of indicator lights 16 and illuminable switches 17. The buttons of switches 17 extend through plate 14, as shown. One light 16 and one switch 17 is provided for each of the indicators 26.

A timing motor or clock 20 is mounted in the case 11 and drives a shaft 23 at a constant suitable speed through a pair of meshed gears 21 and 22 having a suitable gear ratio. As shown, gear 21 is the output gear of clock 20 and gear 21 is fixed to one end of shaft 23 which is rotatably supported in casing walls 12 and 13.

A plurality of discs or disc members 25, of any suitable magnetic material, are disposed in spaced series along shaft 23 and between walls 12 and 13. A plurality of spacers 24 are provided on shaft 23 each having a flange 31 at one end and being disposed between two of the discs 25 which are in spaced series. A plurality of indicator discs or disc members 26 are disposed in spaced series along shaft 23 each being freely rotatable on one of the spacers 24. Each disc 26 also is permitted limited or minimal movement axially on shaft 23 and between the flange 31 and its associated magnetic disc 25 which are at opposite ends of the spacer 24 on which such indicator disc is free to rotate. Magnetic discs 25 are fixedly connected to shaft 23, for rotation in unison, by any suitable means well known in the art. It should be understood, however, that such connecting means must permit assembly of discs 25 and 26 and spacers 24 on shaft 23 with facility.

Each indicator disc 26, preferably of larger diameter than discs 25, has a contrasting, painted or marked peripheral portion 27. The leading edge of portion 27 is disposed adjacent the bottom edge of window 15 and out of view when the disc 26 is idling or not being rotated. When one of the discs 26 is rotatably driven (clockwise as viewed in FIGURE 3) the contrasting peripheral portion 27 thereof will be rotated adjacent window 15 and will appear as a column or bar progressively rising or increasing with time. Thus, the contrasting indicating portions 27 of discs 26 provide a bar graph when viewed through window 15 with the height of each bar indicating an elapsed time interval and the differences between the relative heights of such bars indicating elapsed time differences.

To derive such elapsed time interval indications, a plurality of electromagnets 28 are singly connected to the sides of indicator discs 26 opposite from the associated magnetic discs 25 or adjacent the flanges 31 of spacers 24, and have their poles extending through the respective discs to which they are connected. Each electromagnet 28 is positioned adjacent to the leading end of the peripheral portion 27 or substantially at the bottom of the disc 26 to which it is connected when such disc is idling or not being rotated.

Energization of any one of the electromagnets 28 will magnetically couple the indicator disc 26, to which it is connected, to the associated and adjacent rotating magnetic disc 25 for rotation thereby. Thus, the contrasting portion 27 of a coupled indicator disc 26 is progressively moved into view through window 15 at a constant speed so the height of the visible column is representative of the elapsed time interval or time duration of rotation. Since clock 20 rotates the shaft 23 and all the magnetic discs 25 as a unit, the contrasting portions 27 of all the coupled indicator discs 26 will progressively move at the same rate of speed.

An energized electromagnet 28 is progressively elevated by the rotating disc 26 on which it is mounted. Thus, the weight of such an elevated electromagnet 28 when de-energized will cause such displaced disc to rotate and return to its idling position. Each of the indicating discs 26 may be profiled or undercut as indicated at 29 to assist in painting or marking the contrasting portion 27 and to provide improved readability by defining a sharp leading end of the indication. A profile 29 can find additional utility by increasing the weight imbalance.

To limit the rotation of the indicator discs 26, each between a predetermined idling or non-indicating position and a predetermined maximum position, a plurality of stop or tab members 30 are provided, as shown. One of the tab members 30 extends from the periphery of each of the indicator discs 26 and is movable thereby in an arcuate path between a pair of spaced limit rods 18 and 19. Each of the rods 18 and 19 is connected at its ends to side walls 12 and 13 and, in addition to providing a limiting abutment for tabs 30 of indicator discs 26, it provides a tie rod brace for casing 11.

The indicating assemblies, each comprising a magnetic disc 25 and a non-magnetic indicating disc 26 suitably connected to shaft 23 by a spacer 24, may be modified as shown in FIGURES 4, 4A and 4B, and in FIGURE 5 which also illustrates a modified shaft and drive arrangement.

Referring first to FIGURE 5, a modified timing motor or clock 20A, corresponding to motor 20, is coupled at one end directly to a shaft 23A, corresponding to shaft 23. A plurality of magnetic discs 25A (see also FIGURES 4 and 4B), corresponding to discs 25, are fixed directly to shaft 23A in spaced series for rotation thereby. A plurality of non-magnetic indicating discs 26A (see also FIGURES 4 and 4A), corresponding to discs 26, are freely rotatable on shaft 23A.

Each disc 26A is disposed adjacent to an associated magnetic disc 25A, and is provided with a contrasting peripheral portion 27A and an electromagnet 28A which correspond to a contrasting portion 27 and an electromagnet 28, respectively. Each of the discs 26A may be profiled as at 29A (FIGURE 4A), corresponding to a profile 29, and is provided with a tab 30A (FIGURES 4A and 5), corresponding to a tab 30. To prevent indicator discs 26A from moving excessively from the associated adjacent magnetic discs 25A, a plurality of spring retaining clips or lock washers 31A (see FIGURE 4) may be provided on shaft 23A, preferably grooved thereat each adjacent to the side of a disc 26A having an electromagnet 28A and sufficiently spaced from the associated adjacent magnetic disc 25A to permit minimal movement of discs 26A axially on shaft 23A.

All of the indicating assemblies of the novel device 10, or the modified indicating assemblies, will operate in the same manner. An electric control circuit for one such indicating assembly is diagrammatically shown in FIGURE 7 and will be described as applied to an automatic drive-in type restaurant as is shown, described and claimed in pending U.S. application, S.N. 219,222 now Patent No. 3,267,436 which was filed Aug. 24, 1962 by N. Alpert, R. M. Berler and R. Townsend. While the present invention is particularly adapted to the environment of the above application, it should be understood that there is no intent to define the limits of the present description of operation thereof in such environment.

Referring now specifically to FIGURE 7, a normally open momentary switch 31 at a customer station is closed by a customer, manually or by removing a telephone (not shown), to establish a customer call circuit connected to an electric power source E and, thus, energizes a coil 33 of a holding relay 32, energizes an approprate electromagnet 28, and causes an appropriate lamp 35 to light. The energized coil 33 closes a normally open switch 34 of relay 32 to establish a customer call maintaining circuit through a normally closed switch 38 of a switching relay 36 to bypass the customer switch 31 which opens when released. The remaining response, resulting from momentary closure of switch 31, is directed to an operator who is to take the customer's order and is provided with a device made in accordance with the present invention.

Accordingly, the energized electromagnet 28 couples the indicator disc 26, on which it is mounted, to the associated and adjacent to magnetic disc 25 being rotated with shaft 23 at a constant speed by the clock 20. The coupled disc 26 is the one provided for the calling station and, as it rotates, its contrasting peripheral portion 27 provides an indication visible through window 15 (FIGURE 1), progressively rising or increasing with time, representative of the elapsed time interval since the call was initiated by closing switch 31. Lamp 35 is housed in the appropriate station switch 17 and illuminates the switch button thereof which extends through panel 14 (FIGURE 1) directly below and alined with the corresponding disc 26 which is rotating.

The operator, when free, scans the bar graph presented by the portions 27 of coupled discs 26 visible through lens 15 (FIGURE 6), to determine the customer station on call the longest. The operator then passes the illuminated button of a switch 17 which is alined below the highest indicator column to close the appropriate response switch 17. To aid operator scanning, window 15 may have vertically spaced horizontal reference or calibration lines, as indicated in FIGURE 6.

Closing switch 17 establishes an operator response circuit, connected to the electrical power D.C. source E and energizes coil 37 of the transfer relay 36 and causes the appropriate lamp 16 to light (see also FIGURES 1, 2 and 3), alined above the corresponding disc 26 and the button of the closed switch 17. The energized coil 37 simultaneously opens the normally closed switch 38 and closes a normally open switch 39 of transfer relay 36.

Open switch 38 breaks the customer call maintaining circuit causing coil 33 to de-energize and reset relay 32, electromagnet 28 to de-energize and uncouple the appropriate disc 26 which returns to its idling position and removes its indication from window 15, and lamp 35 to extinguish. Simultaneously, closed switch 39 establishes an operator response maintaining circuit through a normally closed complete switch 40 which, in this instance, would be in the computer of the restaurant equipment of the aforementioned application.

When the order has been taken and entered, and the restaurant equipment is cleared to accept a subsequent order, complete switch 40 opens momentarily to break the operator response maintaining circuit. Coil 37 is de-energized resetting transfer relay 36 and lamp 16 is extinguished freeing the operator to accept a call from another customer station.

It should be understood that the circuitry and its components may be modified or changed in accordance with the present invention. The basic requirements, however, to provide properly sequenced and rapid operation of the novel device 10 must be satisfied. A first or customer call circuit means for each station is required to couple the appropriate indicator disc 26 and provide an elapsed time interval and, simultaneously, illuminate the appropriate operator response switch 17. A second or operator response circuit means for each station is required to cancel the signals provided by the customer call circuit means and, simultaneously, illuminate the appropriate lamp 16. Lamps 16 are memory indications and the only means, when lit, to identify the customer station call taken by the operator. Only one of the lamps 16 will be lit at any one time and it will remain lit until the computer (not shown) is cleared and the complete switch 40 opens.

Although several embodiments of the invention have been illustrated and described in detail, it is to be expressly understood that the invention is not limited thereto. Various changes may be made in the design and arrangement of the parts without departing from the spirit and scope of the invention as the same will now be understood by those skilled in the art.

What is claimed is:

1. In an elapsed time measuring and indicating device, in combination
   a shaft and means for driving the shaft at a predetermined constant speed;
   at least one plate member disposed on the shaft and fixedly connected thereto at a spaced point along its length for rotation thereby;
   a disc member freely rotatable on the shaft disposed adjacent and parallel to each plate member, each disc member having a non-indicating idling position and a peripheral portion for providing an indication representing an elapsed time interval when the disc member is rotated from its idling position;
   a different electromagnet means for magnetically coupling when energized each disc member to the adjacent plate member for rotation thereby;
   a first and second switch means for each of the electromagnet means and the corresponding disc member;
   electric circuit means responsive to operation of each of the first switch means to cause energizing of one of the electromagnet means in accordance with the operated first switch means for selectively coupling the corresponding disc member to the adjacent plate member for rotation thereby and away from its idling position at the beginning of an elapsed time interval; the circuit means being responsive to operation of each of the second switch means to cause de-energizing one of the energized electromagnet means in accordance with the operated second switch means for selectively decoupling the corresponding disc member from the adjacent plate member and permitting the decoupled disc member to return to its idling position at the end of the elapsed time interval; and
   window means to provide visual presentation of the peripheral indicating portions of the disc members.

2. The device in accordance with claim 1, and
   a different signal means for each of the second switch means connected to the circuit means and selectively energized by operation of each of the first switch means for providing a signal to identify the second switch means corresponding to a coupled disc member in accordance with the operated first switch means, and operation of the identified second switch means causing such signal to be terminated.

3. The device in accordance with claim 2, and
   a face plate;
   the window being disposed in the face plate;
   each of the second switch means having an operating member extending through the face plate;
   a different visual signal means for each of the second switch means arranged with the face plate and connected to the circuit means for providing a signal visible through the face plate in response to operation of the corresponding second switch means;
   a third switch means for each of the visual signal means and connected to the circuit means for terminating the signal provided by the corresponding visual signal means when operated after a time delay; and
   the peripheral indicating edges and push buttons of corresponding disc members and second switch means being disposed in substantial alinement with corresponding visual signal means.

4. The device in accordance with claim 3, wherein each of the first switch means is operated in response to a different outside demand, and the third switch means is operated in response to satisfaction of such an outside demand.

5. The device in accordance with claim 1, in which each plate member is a disc of magnetic material;
   each disc member is of a non-magnetic material having its peripheral indicating portion suitably marked; and
   each electromagnet means being an electromagnet attached to the corresponding disc of non-magnetic material with its poles extending therethrough towards the adjacent disc of magnetic material, and positioned inwardly from the periphery of and angularly relative to the disc to which it is connected to cause the disc to return to its idling position when de-energized due to the weight thereof.

6. The device in accordance with claim 1, and
   a pair of spaced limit rods disposed relative to the discs of non-magnetic material, one defining a starting non-indicating position for each of such idling discs and the other defining a maximum indicating position therefor; and
   each of said discs of non-magnetic material having a tab means extending from the periphery thereof and movable between the spaced limit rods and into engagement therewith by rotation by such discs to limit each of such discs to rotation between determined starting and maximum indicating positions.

7. The device in accordance with claim 6, wherein each disc of non-magnetic material has a recess in the periphery thereof defining at one end the leading end of the peripheral indicating portion of such disc.

8. The device in accordance with claim 6, wherein the peripheral indicating portions of the discs of non-magnetic material are visibly presented by the window as a bar graph, each of the bars representing a different elapsed time interval each being increased progressively with passing of time and at the same rate of speed as the others of the bars by rotation of the discs of non-magnetic material.

9. The device in accordance with claim 8, and
   the window having a plurality of vertically spaced horizontal reference lines.

10. The device in accordance with claim 6, and a plurality of members disposed immovably axially on the shaft each on the side of a disc of non-magnetic material opposite from the adjacent disc of magnetic material to limit movement of the disc of non-magnetic material axially on the shaft.

References Cited

UNITED STATES PATENTS 2,735,085   2/1956   West _____ 58—39.5

RICHARD B. WILKINSON, *Primary Examiner.*

MICHAEL LORCH, *Assistant Examiner.*